United States Patent Office 3,539,449
Patented Nov. 10, 1970

---

3,539,449
PROCESS FOR PREPARING CONESSINE DERIVATIVES
Arthur Friedrich Marx and Willem Frederik van der Waard, Delft, Netherlands, assignors to Koninklijke Nederlandsche Gist-en Spiritusfabriek N.V., Delft, Netherlands, a corporation of the Netherlands
No Drawing. Continuation-in-part of application Ser. No. 568,896, July 29, 1966. This application Apr. 17, 1969, Ser. No. 817,161
Claims priority, application Netherlands, July 30, 1965, 6509936
Int. Cl. C07c 167/00
U.S. Cl. 195—51                                                   1 Claim

---

ABSTRACT OF THE DISCLOSURE

Conessine derivatives of the class of 9α-hydroxy-conessine, 12α-hydroxy-conessine, acid addition salts and quaternary ammonium compounds thereof are prepared by subjecting conessine to the action of enzymes of *Botryodiplodia theobromae* Pat., and recovering 9α-hydroxy-conessine and 12α-hydroxy-conessine. These products can be, optionally, converted to acid addition salts and quaternary ammonium compounds.

---

REFERENCE TO A PRIOR APPLICATION

This application is a continuation-in-part of application Ser. No. 568,896 filed on July 29, 1966, now U.S. Pat. 3,466,279, and entitled "Conessine Derivatives" and a division thereof.

In the Dutch patent application 280,926 a process is described according to which conessine is subjected to the action of micro-organisms; in this process conessine is converted into 3-oxo-4-conenine having the structural formula as shown below.

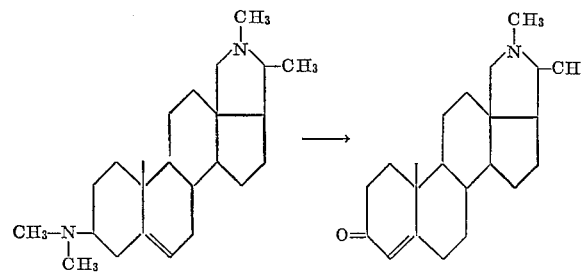

One of the micro-organisms which can be profitably used for this conversion is the fungus *Stachybotrys parvispora*. By increasing the assimilable carbohydrate content of the medium in which the said fungus was cultivated the primarily formed 3-oxo 4-conenine could be converted further almost quantitatively into 11α-hydroxy 4-conenine-3-one having the formula shown below.

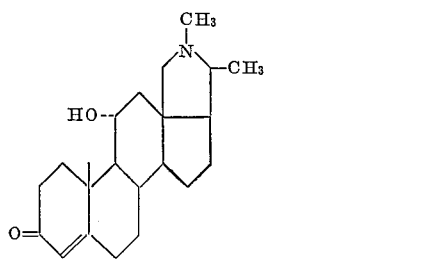

This process is described in the Dutch patent application 6402112.

In the Dutch patent application 6405471 a process is described in which conessine is converted into 7α-, 7β-, and 11α-hydroxyconessine having the structural formula shown below.

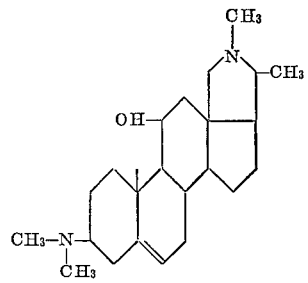

by the use of enzymes of suitable fungi from the genera Gloeosporium, Colletotrichum, and Myrothecium. Furthermore a purely chemical method for the preparation of 3-oxo-1,4-conadienine illustrated below.

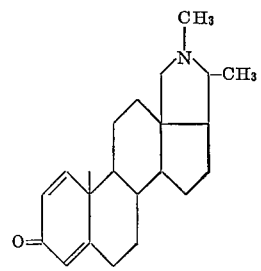

by starting from conessine is described in the U.S. patent specification 2,910,470.

It is an object of the present invention to provide a process for preparing 9α-hydroxyconessine and 12α-hydroxyconessine as well as acid addition salts and quaternary ammonium derivatives thereof.

Other objects will become more apparent as the description thereof proceeds.

It was now found that 9α-hydroxyconessine and 12α-hydroxyconessine having the respective formulae as shown below:

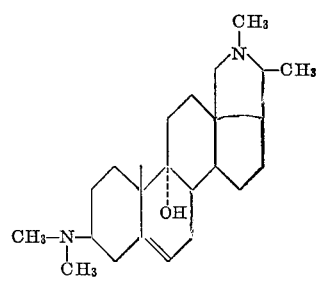

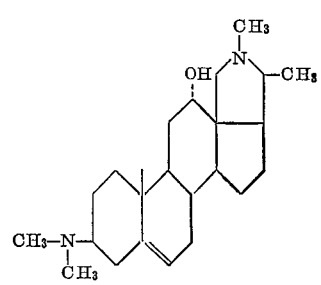

can be prepared by subjecting conessine to the action of enzymes of *Botryodiplodia theobromae* Pat., which are formed by cultivtaing the micro-organism in a Raulin-Thom medium. According to the invention the compounds obtained, may be converted into acid addition salts or mono- or bis-quaternary compounds. The salts can also be used for the isolation and/or purification of the reaction product.

*Botryodiplodia theobromae* Pat. is the imperfect form of *Physalospora rhodina* (Berk. et Curt.) Cke., isolated from infested coconut pulp.

In the process according to the invention preferably a submerged culture of *Botryodiplodia theobromae* Pat. is made to act under aerobic conditions on the starting product. Shaking or stirring may be applied. The conessine is preferably added to the culture in the form of a solution of a salt.

When the conversion to 9α-hydroxyconessine and 12α-hydroxyconessine is complete, which is checked preferably by means of chromatography, the final product is isolated from the culture, preferably by filtration and extraction. With the aid of known methods, e.g., by conversion into functional derivatives, crystallization, and/or extraction, the final products can be obtained separately in a state of purity.

The compounds 9α-hydroxyconessine and 12α-hydroxyconessine obtained according to the invention have not been described before. The said substances are intermediates for the preparation of the salts and the quaternary ammonium compounds, which can be used as muscular relaxing agents.

The salts include the mono- and di-acid-addition salts, particularly non-toxic pharmacologically acceptable acid-addition salts. Acids useful in preparing the addition salts comprise, among others, organic acids, such as oxalic, tartaric, citric, succinic, acetic, fumaric, lactic and maleic acid; and inorganic acids, such as nitric, sulphuric, phosphoric, boric and especially hydrohalic acids, e.g. hydrobromic and hydrochloric acid.

The quaternary ammonium derivatives include mono- and bis-quaternary ammonium compounds. These compounds are prepared by reacting the corresponding non-quaternized compounds with a quaternizing agent.

Suitable quaternizing agents are the familiar esters of aliphatic and araliphatic alcohols derived from strong acids. Aliphatic and araliphatic esters of sulphuric acid, hydrohalic acids, such as hydrochloric acid, hydrobromic acid, or hydroiodic acid, may be mentioned as examples. As alcohols, of particular importance are the lower alkanols, lower alkenols, phenyl-lower-alkanols and cyclo-alkyl-lower-alkanols. The quaternizing esters are preferably ethyl iodide, methyl iodide, ethyl bromide, methyl bromide, methyl sulphate, allyl bromide, benzyl bromide, cyclohexylmethyl bromide, etc.

The quaternizing reaction is carried out in the conventional way, e.g. by boiling 9α-hydroxyconessine or 12α-hydroxyconessine in a suitable solvent, such as acetonitrile, alcohols, mixtures of alcohols and water, benzene, or acetone with an alkyl or aralkyl ester of a strong acid.

The invention also relates to pharmaceutical compositions comprising a minor amount of at least one quaternary ammonium compound of 9α-hydroxy- or 12α-hydroxyconessine and a major amount of a pharmaceutical carrier. The pharmaceutical compositions can be prepared in a usual way. The quaternary ammonium compounds in question are preferably dissolved in a physiological salt solution, may or may not be placed in particular doses in ampoules under an inert gas, and may subsequently be sterilized in the conventional way. The compositions can be used for human as well as veternary practice.

The following examples serve to illustrate the process according to the invention, but are not to be construed as limiting the invention. For example, it is possible to use other culture media as well.

EXAMPLE I

A medium according to Raulin-Thom, which contains 25 g. of glucose, 2.7 g. of tartaric acid, 2.7 g. of ammonium tartrate, 0.4 g. of secondary ammonium phosphate, 0.4 g. of potassium carbonate, 0.3 g. of magnesium carbonate, 0.7 g. of ammonium sulfate, 0.05 g. of zinc sulfate, and 0.05 g. of ferrous sulfate per litre of water, is brought to pH=5 with 30% potassium hydroxide solution and sterilized for 20 minutes at 120° C.

A 2-litre flask containing 500 cm.$^3$ of this culture medium, is inoculated from a tube with *Botryodiplodia theobromae* Pat. and shaken for three days at 26° C. Subsequently 4.5 litres of this culture are transferred to a 1500 litre vessel containing 200 litres of sterilized main fermentation medium, consisting of 5 g. of glucose and 5 g. of corn steep liquor—calculated as dry matter—per litre, the pH of which has been brought to 6.8 with sodium hydroxide solution, and 100 cm.$^3$ of anti-foaming oil. The culture is kept at a temperature of 26° C., aerated with 200 litres of sterile air per minute and stirred at a rate of 150 r.p.m. Under steril conditions, 24 hours after the inoculation of the main fermentation medium a solution of 50 g. of conessine in dilute sulfuric acid of pH=2.0 is added and the mixture is stirred and aerated at the same temperature for another 22 hours. The conversion is found to have taken place as to about 90%. At the end of the process the pH is 7.4–7.6.

The fermentation broth is acidified with sulfuric acid to pH=2–3 and filtered. The filtrate is rendered alkaline with sodium hydroxide solution to pH=10 and extracted three times with one third its volume of methyl isobutyl ketone. The extract is concentrated and extracted with acid. The acid aqueous layer, after being made alkaline, is extracted once more with methyl isobutyl ketone. The extract is evaporated. The yield of crude product is 85%, calculated on conessine.

89.2 g. of the crude product is dissolved in 1 litre of pyridine. After addition of 125 g. of succinic anhydride, the mixture is heated for 6 hours to 100° C. and then kept overnight at room temperature. By evaporation under reduced pressure the pyridine is removed as much as possible. The residue is taken up in the system as much anol, water, and methyl isobutyl ketone. After the pH have been brought to 9.5, 15 g. of precipitate is formed, which according to chromatographic analysis is found to consist substantially of 9α-hydroxyconessine.

At the said pH the 12α-hydroxyconessine hemisuccinate is reasonably stable and remains dissolved as a salt. From the remaining aqueous layer 9.0 g. of 9α-hydroxyconessine in a state of impurity can further be obtained by extraction with methyl isobutyl ketone.

Recrystallization from methyl isobutyl ketone yields 15.9 g. of 9α-hydroxyconessine with a melting point of 205.5°–208° C. and $[\alpha]_D^{20} = -39°$ (c.=1.01 in chloroform).

*Elemental analysis.*—Calcd. (percent): C, 77.42; H, 10.75; N, 7.52. Found (percent): C, 77.34; H, 10.81; N, 7.43.

The NMR spectrum gives the following δ values with respect to tetramethyl silane in deuterochloroform after extraction with heavy water:

1.083 p.p.m. for the three protons attached to C-atom 19
1.025 p.p.m. for the doublet of the three protons attached to C-atom 21
5.41 p.p.m. for the proton attached to C-atom 6
3.05 and 1.98 p.p.m. for the two doublets of the two protons attached to C-atom 18.

The aqueous layer, from which 9α-hydroxyconessine has been extracted, is now rendered more strongly alkaline by addition of 100 cm.$^3$ of 11 N sodium hydroxide solution, in consequence of which 12α-hydroxyconessine-hemisuccinate slowly decomposes. Extractions with methyl isobutyl ketone then yield 54.7 g. of crude product. By fractional recrystallization from benzene a preparation of 12α-hydroxyconessine with a melting point of 257–259° C. (20.15 g.) is then obtained. $[\alpha]_D^{20} = +39°$ (c.=1.09 in chloroform).

*Elemental analysis.*—Calcd. (percent): C, 77.42; H, 10.75; N, 7.52. Found (percent): C, 77.22; H, 10.81; N, 7.74.

The NMR spectrum is characterized by the following δ values with respect to tetramethyl silane in deuterochloroform after extraction with heavy water:

0.925 p.p.m. for the three protons attached to C-atom 19
1.025 p.p.m. for the three protons attached to C-atom 21. A doublet occurs.
5.35 p.p.m. for the proton attached to C-atom 6
3.86 p.p.m. for the proton attached to C-atom 12
3.01 and 1.78 p.p.m. for the two doublets of the two protons attached to C-atom 18.

Separate experiments have been carried out to determine the position of the hydroxyl groups and the configuration of the C-atoms carrying the hydroxyl groups. They are briefly described below.

(a) 12α-hydroxyconessine, which according to the infra-red spectrum and the elemental analysis contains a hydroxyl group, can be acetylated and oxidized. The oxidation product, obtained by treatment of 12α-hydroxyconessine with a solution of chromium trioxide in 90% acetic acid, is identical with 12-oxo-conessine, obtained by oxidation of holarrhenine, which is known to be 12β-hydroxyconessine. The melting point found is 130–131° C. and the results of the elemental analysis are:

Calcd. (percent): H, 10.27; C, 77.84; N, 7.57. Found (percent): H, 10.30; C, 77.65; N, 7.52 $[\alpha]_D^{20} = +32°$ (c.=1.1 in ethanol).

The infra-red spectrum gives an absorption of a six-ring ketone. Reduction of the oxidation product with lithium aluminium hydride gives both holarrhenine and 12α-hydroxyconessine again, to be separated by crystallization. The two products have been identified by means of the melting points, the mixed melting points, the infra-red spectra, and the chromatographic $R_f$ values.

(b) It is not possible to acylate 9α-hydroxyconessine. The presence of a tertiary hydroxyl group is confirmed by the fact that 9α-hydroxyconessine cannot be oxidized. The NMR spectrum points to the 9α-hydroxy compound. According to Zürcher (Helv. Chim. Acta 46, (1963) 2054) a chemical shift of the protons attached to C-atom 19 of 0.142 p.p.m. with respect to corresponding protons in conessine takes place, so that a δ value of 1.072 was to be expected for this group. The value found was δ=1.083 p.p.m. The 9β-hydroxyl group would cause a shift of 0.083 p.p.m. of the protons, so that this possibility is not very likely. More certainty concerning the position of the hydroxyl group in 9α-hydroxyconessine has been obtained in the following way:

9α-hydroxyconessine and the known compound 11α-hydroxyconessine are subjected separately to dehydration. 9α-hydroxyconessine is boiled with toluene sulfonic acid in toluene and 11α-hydroxyconessine is kept tosyl chloride in pyridine at 50° C., upon which in the latter case the ester formed is decomposed with sodium acetate in glacial acetic acid.

In both cases dehydration then takes place. After purification and crystallization, the two reaction products are compared as to their melting point, which is found to be 98–100° C., their mixed melting point, NMR spectrum, and infra-red spectrum. In both cases the dehydration product is $\Delta^{9(11)}$-conessine illustrated above.

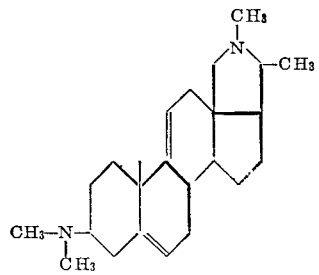

Further it has been possible, starting from 11α-hydroxyconessine, to arrive at a structural comparison with 9α-hydroxyconessine. For this purpose first the double bond in position 5, 6 in both substances is hydrogenated in the presence of Adams platinum catalyst, as a result of which 11α-hydroxy-3β-dimethylaminoconanine, shown below:

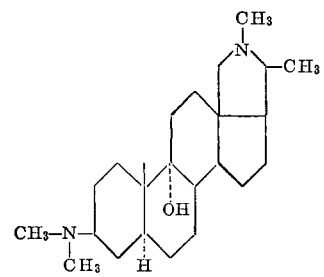

having a melting point of 172–172.5° C. and $[\alpha]_D^{20} = 42°$ (c.=0.5 in chloroform) and 9α-hydroxy-3β-dimethylaminoconanine, shown below:

having a melting point of 203–204° C. and $[\alpha]_D^{20} = +35°$ (c.=0.5 in chloroform) respectively are obtained. According to the literature (Fieser and Fieser, "Steroids" (1959), p. 271) upon catalytic reduction of Δ⁵-steroids almost exclusively the 5α compound is formed. An equatorial substitute at C-atom 3 does not affect the course of the reduction.

The hydrogenated 5α compounds show a more polar behavior in thin-layer chromatography than the corresponding hydrogenated 5β compounds. (Coll. Czech. Chem. Comm. 28 (1963) 2932). In this case again the 5α compounds are formed.

The next step is the dehydration of 11α-hydroxy-3β-dimethylaminoconanine via its tosyl ester with sodium acetate in glacial acetic acid to form 3β-dimethylamino-$\Delta^{9(11)}$-conenine having a melting point of 110–110.5° C. and $[\alpha]_D^{20} = 44°$ (c.=0.5 in chloroform).

Infra-red spectra and NMR spectra are in conformity with the structure. 3β-dimethylamino-$\Delta^{9(11)}$-conenine can be completely converted with perphthalic acid at 0° C. into 3β-dimethylamino-9α-11α-epoxyconanine 3-N-oxide, as appears from the NMR spectrum. The product cannot be obtained in the crystalline form.

The epoxide can then be converted into 3β-dimethylamino-9α-hydroxyconanine by reduction with lithium aluminium hydride. Identification is effected by means of a mixed-melting point determination with hydrogenated 9α-hydroxyconessine, elemental analysis, and infra-red analysis. Melting point 202–203° C.; $[\alpha]_D^{20} = 34°$ (c.=0.5 in chloroform).

EXAMPLE II

Preparation of 9α-hydroxyconessine bis-methiodide

A mixture of 400 mg. of 9α-hydroxyconessine, 2 ml. of freshly distilled methyliodide and 20 ml. of methanol is refluxed for 1 hr. The reaction mixture is then concentrated and the crystallized product filtered off and dried. The crude product (406 mg.) is crystallized from methanol-acetone (1:1; v./v.) yielding 264 mg. of pure 9α-hydroxyconessine bis-methiodide; M.P. 305–306° C. I.R. (KBr): 3463, 3017, 1025, 960, 912, 840 cm.$^{-1}$.

Calcd. for $C_{26}H_{46}I_2N_2O$ (656) (percent): C, 47.56; H, 7.01; I, 38.72; N, 4.27. Found (percent): C, 47.82; H, 7.33; I, 38.63; N, 4.06.

EXAMPLE III

Preparation of 12α-hydroxyconessine bis-methiodide

In the same way 12α-hydroxyconessine is transformed into 12α-hydroxyconessine bis-methiodide. The pure product has a M.P. of 293–294° C. I.R. (KBr): 3350, 3015, 1040, 950, 910, 840 cm.$^{-1}$.

Calcd. for $C_{26}H_{46}I_2N_2O$ (656) (percent): C, 47.56; H, 7.01; I, 38.72; N, 4.27. Found (percent): C, 47.79; H, 7.28; I, 38.67; N, 4.07.

We claim:

1. A process for preparing conessine derivatives selected from the group consisting of 9α-hydroxy-conessine, 12α-hydroxy-conessine, organic and inorganic acid addition salts thereof, and quaternary ammonium derivatives thereof derived from esters of strong mineral acids and alcohols selected from the group consisting of lower-alkanols, lower-alkenols, phenyl-lower-alkanols, and cycloalkyl-lower-alkanols, the process comprising the steps of subjecting conessine to the action of enzymes of *Botryodiplodia theobromae* Pat., and recovering said 9α-hydroxyconessine and 12α-hydroxyconessine, and optionally converting the same into derivatives selected from the group consisting of acid addition salts by reaction with acids, and quaternary ammonium compounds, by reaction with esters of strong inorganic acids with alcohols selected from the group consisting of lower-alkanols, lower-alkenols, phenyl-lower-alkanols and cycloalkyl-lower-alkanols.

References Cited

UNITED STATES PATENTS 3,047,470   7/1962   Pruess et al. _____ 195—51
3,472,736   10/1969   Flines _____ 195—51

ALVIN E. TANENHOLTZ, Primary Examiner

U.S. Cl. X.R.

260—239.5